United States Patent [19]
McNally

[11] Patent Number: 6,082,989
[45] Date of Patent: Jul. 4, 2000

[54] SLUSH MOLDING APPARATUS

[76] Inventor: Douglas J. McNally, 95 St. Michael Avenue, Chatham, Ontario, Canada, N7M 3E7

[21] Appl. No.: 09/191,618

[22] Filed: Nov. 13, 1998

[51] Int. Cl.$^7$ ..................................................... B28B 21/00
[52] U.S. Cl. ................. 425/435; 264/302; 264/DIG. 60; 425/DIG. 246
[58] Field of Search ................................... 425/144, 182, 425/256, 425, 435, DIG. 110, DIG. 246; 264/302, 303, DIG. 60

[56] References Cited

U.S. PATENT DOCUMENTS

| | | | |
|---|---|---|---|
| 1,843,786 | 2/1932 | Robinson | 415/119 |
| 2,588,571 | 3/1952 | Porter | 264/302 |
| 2,964,798 | 12/1960 | Ferrell | 264/302 |
| 3,315,016 | 4/1967 | Wersosky et al. | 264/486 |
| 3,493,994 | 2/1970 | Wersosky et al. | 425/174.8 R |
| 3,728,429 | 4/1973 | Colby et al. | 264/302 |
| 3,775,590 | 11/1973 | Gartner | 392/367 |
| 4,217,325 | 8/1980 | Colby | 264/245 |
| 4,389,177 | 6/1983 | Colby | 382/193 |
| 4,610,620 | 9/1986 | Gray | 425/434 |
| 4,621,995 | 11/1986 | Wersosky | 425/144 |
| 4,623,503 | 11/1986 | Anestis et al. | 264/302 |
| 4,634,360 | 1/1987 | Gray | 425/130 |
| 4,664,864 | 5/1987 | Wersosky | 264/301 |
| 4,683,098 | 7/1987 | Belleville et al. | 264/302 |
| 4,718,140 | 1/1988 | Johnson | 15/330 |
| 4,722,678 | 2/1988 | Wersosky | 425/145 |
| 4,755,333 | 7/1988 | Gray | 264/37 |
| 4,790,510 | 12/1988 | Takamatsu et al. | 249/117 |
| 4,851,177 | 7/1989 | Gray | 264/297.6 |
| 4,867,660 | 9/1989 | Nagase et al. | 425/4 R |
| 4,890,995 | 1/1990 | Gray | 425/144 |
| 4,898,697 | 2/1990 | Horton | 264/37 |
| 4,923,657 | 5/1990 | Gembinski et al. | 264/73 |
| 4,938,906 | 7/1990 | Brault | 264/163 |
| 5,032,076 | 7/1991 | Jackson, Jr. | 425/435 |
| 5,093,066 | 3/1992 | Batchelder et al. | 264/245 |
| 5,094,608 | 3/1992 | Piazza et al. | 425/434 |
| 5,106,285 | 4/1992 | Preston | 425/144 |
| 5,221,539 | 6/1993 | Pallerberg et al. | 425/144 |
| 5,290,499 | 3/1994 | Tischler | 264/301 |
| 5,316,715 | 5/1994 | Gray | 264/245 |
| 5,443,777 | 8/1995 | Mills | 264/255 |
| 5,445,510 | 8/1995 | Jackson, Jr. | 425/182 |
| 5,525,284 | 6/1996 | Grimmer | 264/301 |
| 5,612,066 | 3/1997 | Swenson | 425/425 |
| 6,019,590 | 2/2000 | McNally | 425/470 |

*Primary Examiner*—Harold Pyon
*Assistant Examiner*—D. Heckenberg
*Attorney, Agent, or Firm*—Flynn, Thiel, Boutell & Tanis, P.C.

[57] ABSTRACT

A molding arrangement and method, such as slush or rotational molding, for forming a thermoplastic shell or skin product. The mold arrangement includes a hollow mold housing provided with a mold shell thereon, which together define an air chamber located within the mold housing. A plurality of air flow control devices, such as centrifugal fans, are mounted within the mold housing and direct heated air into the air chamber through discharge channels defined within the mold housing. The mold arrangement also includes an elongate air supply and heating arrangement which generates heated air within the mold housing and along substantially the entire longitudinal extent thereof to effect uniform heating of the mold shell.

18 Claims, 12 Drawing Sheets

SLUSH MOLDING APPARATUS

FIELD OF THE INVENTION

This invention relates to a molding method and apparatus employing a metal shell mold having a rear surface exposed to a heat source and an inner surface heated to a temperature at which heat gelable thermoplastic material deposited on the inner surface fuses into a thin solid thermoplastic molded product, often referred to as a shell or skin.

BACKGROUND OF THE INVENTION

Thermoplastic powders or slurries, known as dry or liquid plastisols, are conventionally cast on the inner surface of a thin metal mold member heated to the fusion temperature of the deposited material to form a gel coat which is heated sufficiently to form a thin, solid thermoplastic molded member (i.e. a shell or skin). The thin metal mold member remains heated until a thin layer of thermoplastic material is built up on the inner surface to form a thin plastic shell product, such as a product suitable for use as an outer covering on automotive interior products such as door panels, instrument panels, or the like.

The method and apparatus for the production of molded skins or shells are well known, such methods often being referred to as "rotational" or "slush" molding. The mold cavity defined by the mold shell is filled with a flowable plastic material and, due to heating of the mold shell, a thin layer of plastic material adheres to the surface of the mold shell and the remaining plastic material can then be shaken or poured out of the mold, as by rotating the mold. When the mold shell is further heated, the skin or shell product clinging thereto gels out. The finished skin or shell product can then be removed after the mold shell cools down. The operation of introducing the plastic material, when in the form of a powder or granule, is typically achieved by rotating the mold shell so that the mold cavity thereof opens downwardly, and then fixing onto the mold shell a box which contains the plastic material. The overall assembly consisting of the mold shell and mold box is then rotated through about 180° so that the plastic material drops into the mold shell. After the plastic skin or shell has set against the heated mold surface, the mold assembly is rotated back to its original position and the mold box and excess powder removed, with further heating of the mold shell then effecting proper melting and gelling of all of the plastic material adhered to the mold surface. The mold shell is then cooled and the molded skin or shell product removed.

In a typical rotational molding apparatus of the type described above, the mold assembly includes a generally hollow mold housing or box on which the metal mold shell is mounted, which housing and mold shell cooperate to define a hollow interior chamber to which heated air is supplied so as to effect heating of the mold shell from the back surface thereof. This heating of the mold shell, however, has long presented a problem since the irregularity in the shape of the mold shell and the length thereof have often made it difficult to provide the desired degree of heat uniformity as applied to the mold shell throughout the back surface area thereof. The mold shell thus often has undesired hot or cold spots which effect the quality (i.e. thickness and/or finished surface properties) of the molded skin product.

In an attempt to provide better control over the heat applied to the back surface of the mold shell, various flow arrangements have been proposed, including blowing heated air into one end of the mold housing and controlling the flow of the air therethrough with various air flow control devices. Cooler air then exits the opposite end of the mold housing. However, in this arrangement temperature and velocity drops occur from one end of the mold housing to the other as the air moves therethrough, and this can result in unsatisfactory and uneven heating of the mold shell.

It is an object of the invention to provide an improved molding apparatus and method, such as a slush or rotational molding apparatus and method, for forming a thin skin or shell product, which improved method and apparatus is believed to significantly improve the overall performance characteristics of the apparatus and process in terms of efficiency and rate of productivity. The invention provides more efficient heating of the back surface of the mold shell by utilizing an air heating and supply arrangement capable of providing heated air in a more uniform manner along substantially the entire longitudinal extent of the mold housing or box, and a flow control arrangement for directing the heated air towards the back of the mold shell, which flow control arrangement is capable of producing greater air velocity to provide increased air flow and more efficient heating of the mold shell while requiring less heat.

In accordance with the present invention, the improved mold arrangement includes a mold housing defining therein a generally hollow interior and having a mold shell mounted thereon which defines a mold cavity which opens outwardly and is defined by a front surface of the mold shell. The mold housing has a wall structure disposed therewithin which cooperates with a back surface of the mold shell to define an interior air chamber. The wall structure defines a plurality of discharge and feed channels. The feed channels communicate with a source of heated air and the discharge channels communicate with the air chamber. Flow control devices individually communicate with the discharge channels for directing heated air fed thereto from a corresponding one of the feed channels into the air chamber and toward the back surface of the mold shell.

Another aspect of the invention resides in a molding arrangement which includes a mold housing defining therein a generally hollow interior and having a mold shell mounted thereon defining a mold cavity which opens outwardly and is defined by a front surface of the mold shell. The mold housing and a back surface of the mold shell together define an interior air chamber, and the mold housing defines therein a plurality of discharge and feed channels, the discharge channels opening into the air chamber. The mold arrangement includes an elongate tubular member having a portion which extends within the interior of the mold housing and along substantially the entire length thereof. A plurality of openings are provided within this portion of the tubular member and are each aligned with a respective one of the feed channels. The molding arrangement also includes a plurality of air control devices each disposed to communicate with one of the discharge channels for directing heated air fed to the flow control device from a corresponding one of the feed channels into the air chamber and toward the back surface of the mold shell. A heat source including an arrangement for generating heated air within the portion of the tubular member located within the interior of the mold housing provides a uniform flow of heated air to the feed channels through the openings of the tubular member.

Yet another aspect of the invention resides in a mold arrangement which includes a mold housing defining therein a generally hollow interior and having a mold shell mounted thereon which defines a mold cavity which opens outwardly and is defined by a front surface of the mold shell. The mold housing has a wall structure disposed therewithin which cooperates with a back surface of the mold shell to define an interior air chamber. The wall structure includes a plurality of partition walls disposed transversely within the mold housing and defines a plurality of discharge and feed channels arranged in an alternating manner along the longitudinal extent of the mold housing. The discharge channels open into the air chamber and the feed channels communicate with a source of heated air. The mold arrangement also includes a plurality of flow control devices, with at least one flow control device being disposed within each of the discharge channels for directing heated air fed to the flow control device from a corresponding one of the feed channels into the air chamber and toward the back surface of the mold shell. Each flow control device is supported for rotation about an axis substantially parallel to the lengthwise extent of the mold shell.

A further aspect of the invention resides in a method for molding a thin thermoplastic shell including the steps of: providing an elongate tubular member disposed within the interior of the mold housing and extending along substantially the entire longitudinal extent thereof; providing a plurality of centrifugal fans at spaced-apart locations from one another within discharge channels defined within the mold housing which open into the air chamber; supplying heated air into the tubular member and discharging heated air along substantially the entire longitudinal extent thereof directly into feed channels defined within the mold housing between adjacent pairs of discharge channels; and discharging heated air at a high velocity into the air chamber and along the back surface of the mold shell.

The advantageous arrangement and method of the present invention, and the objects and purposes thereof, will be apparent to persons familiar with molding of this general type upon reading the following description and inspecting the accompanying drawings.

Figure 1:
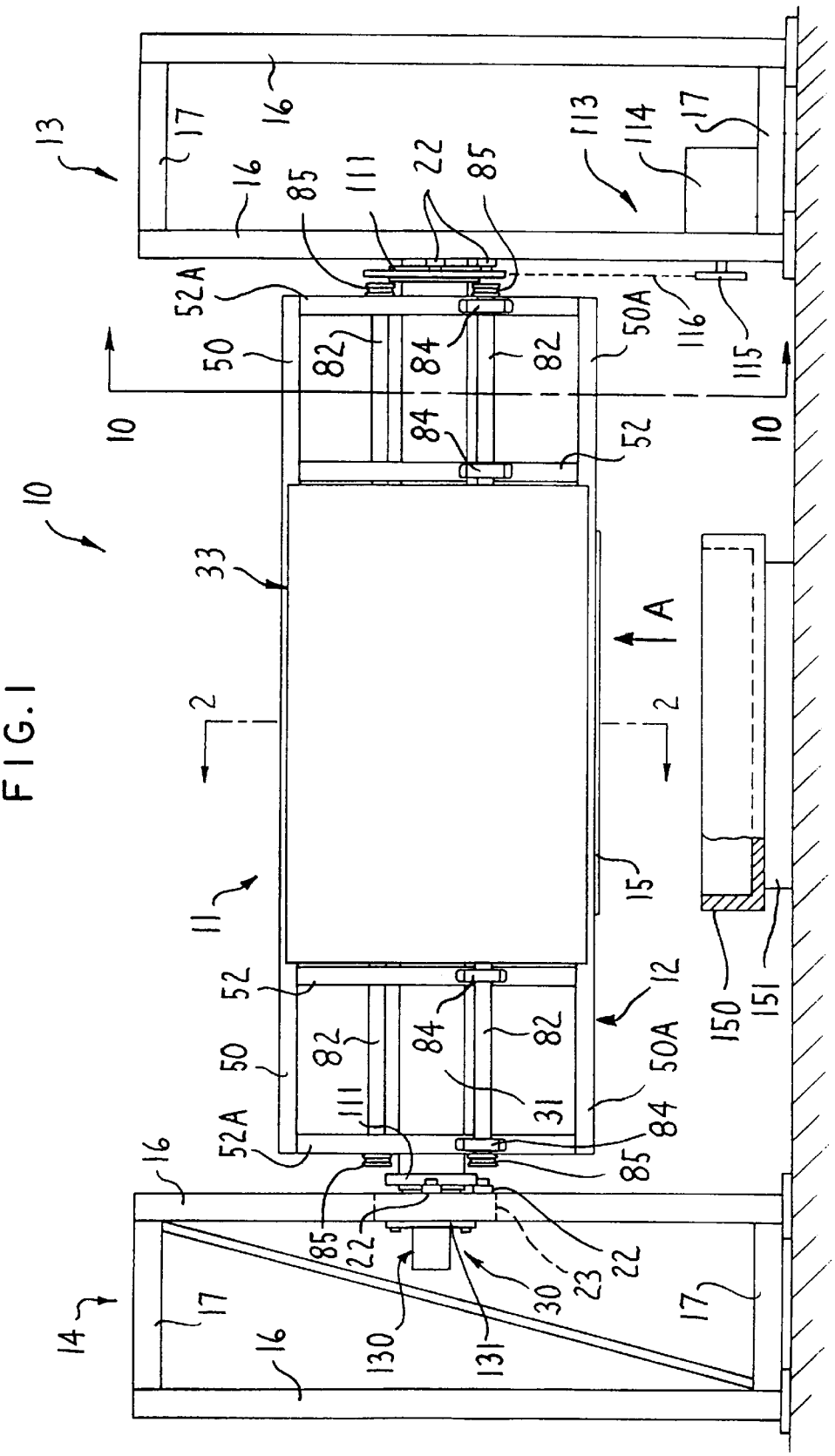
FIG. 1 is a side view of a molding system according to the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 3:
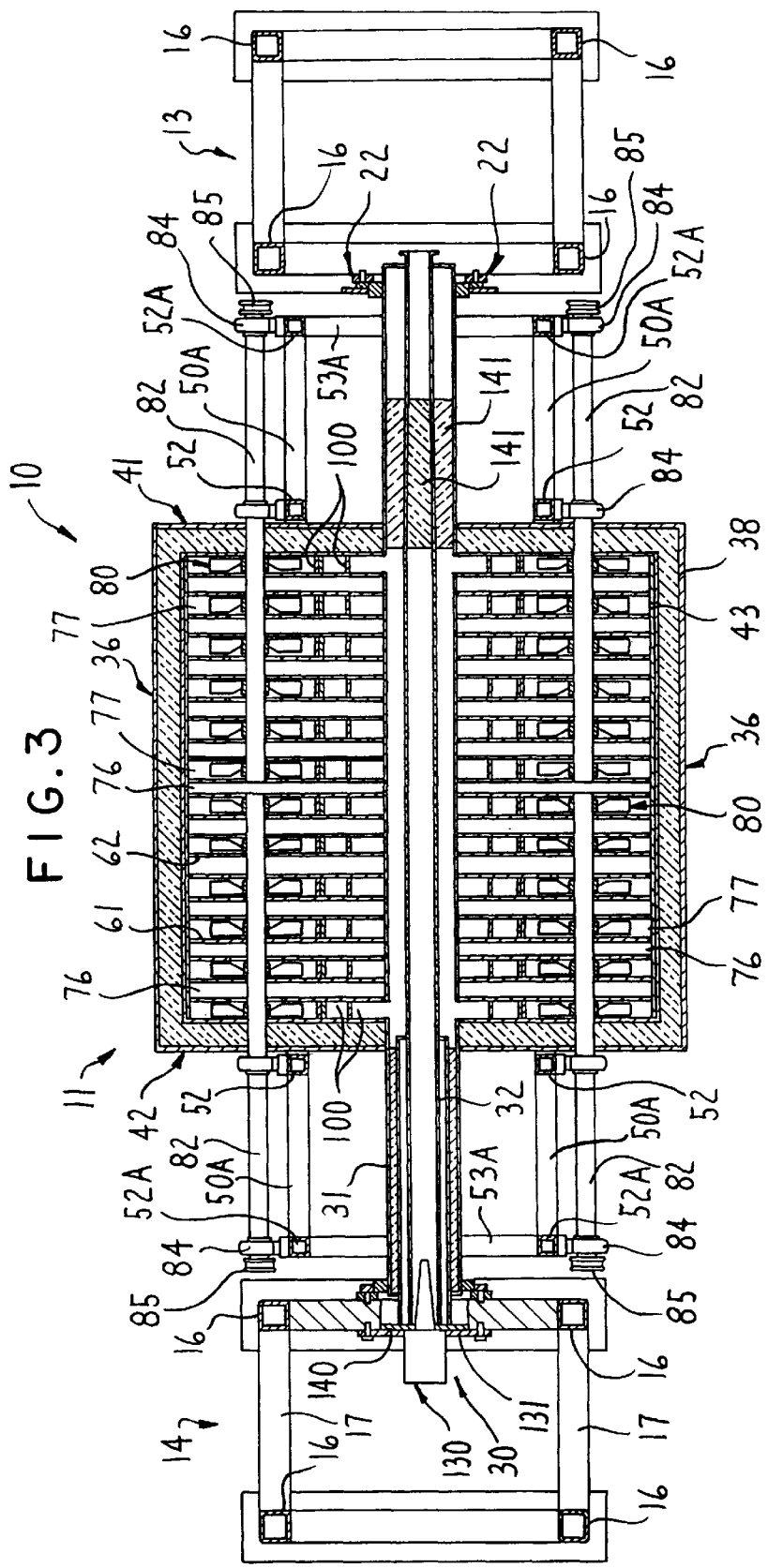
FIG. 3 is a cross-sectional view taken generally along line 3—3 in FIG. 2.

Referring to the drawings, and specifically FIGS. 1 and 3, there is illustrated a molding system 10 according to the present invention. The system 10 includes a mold arrangement 11 having a frame 12, which mold arrangement 11 is located between, and rotatably carried on a pair of spaced-apart and upright right and left end frames 13 and 14. Mold arrangement 11 is preferably configured to carry on one side thereof a large, thin metal mold shell or tool 15 therein.

Right and left end frames 13 and 14 each include four parallel vertical supports 16 arranged in a generally rectangular configuration when viewed in cross-section (FIG. 3), which vertical supports 16 are supported with respect to one another by four horizontal top and four horizontal bottom supports 17 which extend transversely between and interconnect the vertical supports 16 (only some of the top horizontal supports 17 are shown in the drawings).

Figure 10:
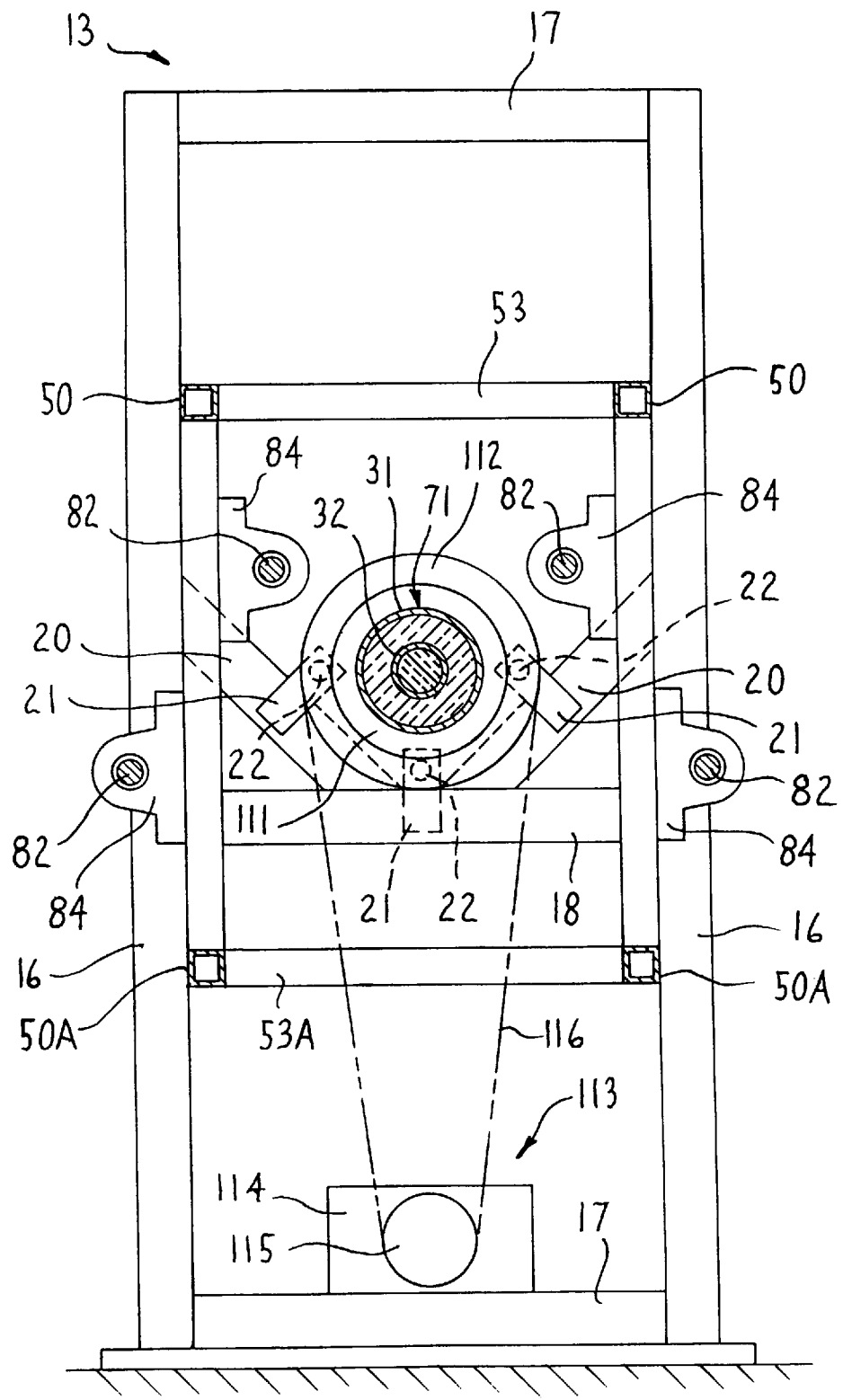
FIG. 10 is an enlarged cross-sectional view taken generally along line 10—10 in FIG. 1.

As shown in FIG. 10, right end frame 13 additionally includes an intermediate horizontal support 18 which extends transversely between and interconnects the innermost pair of vertical supports 16. Right end frame 13 also includes two elongate support bars 20 each having a terminal end fixedly mounted on a middle portion of intermediate support 18, the other terminal ends of the support bars 20 each being fixedly mounted on a respective inner vertical support 16 of right end frame 13. The support bars 20 extend in a diagonal manner between the respective inner vertical support 16 and the intermediate support 18, such that the support bars 20 together form a V-shaped configuration. Each support bar 20 mounts thereon a roller support 21 at a middle region thereof, which roller supports 21 extend perpendicularly with respect to the respective support bar 20, and an additional vertically oriented roller support 21 is mounted on intermediate support 18 at the intersection of the pair of support bars 20. A roller 22 is mounted at the free end of each roller support 21 so as to rotate about a generally horizontal rotational axis.

Figure 6:
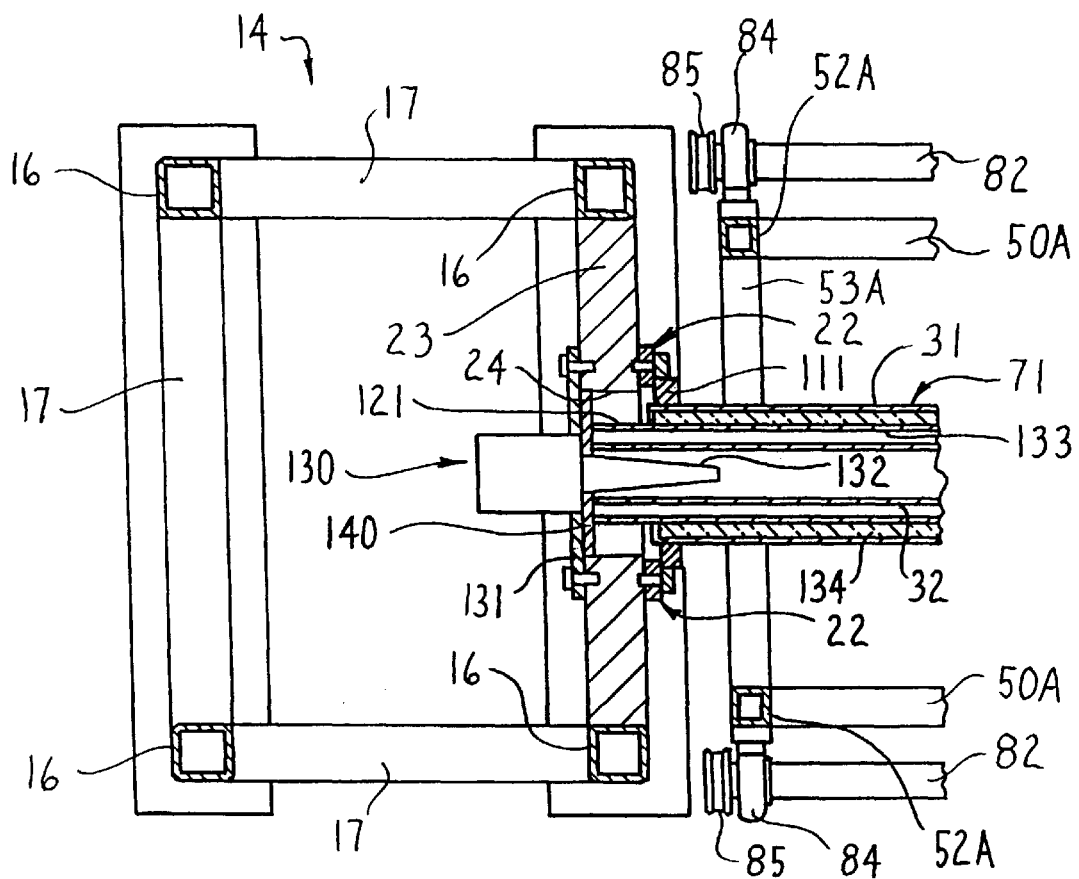
FIG. 6 is an enlarged, fragmentary view of the left longitudinal end of the molding system of FIG. 3.

With reference to FIGS. 1 and 6, left end frame 14 includes a planar wall section 23 which extends transversely between and connects the innermost pair of vertical supports 16 thereof. The wall section 23 preferably has a generally circular opening 24 which extends therethrough, and mounts thereon outwardly of the opening 24 three rollers 22 arranged in a similar manner as rollers 22 of right end frame 13 (FIG. 10).

Figure 2:
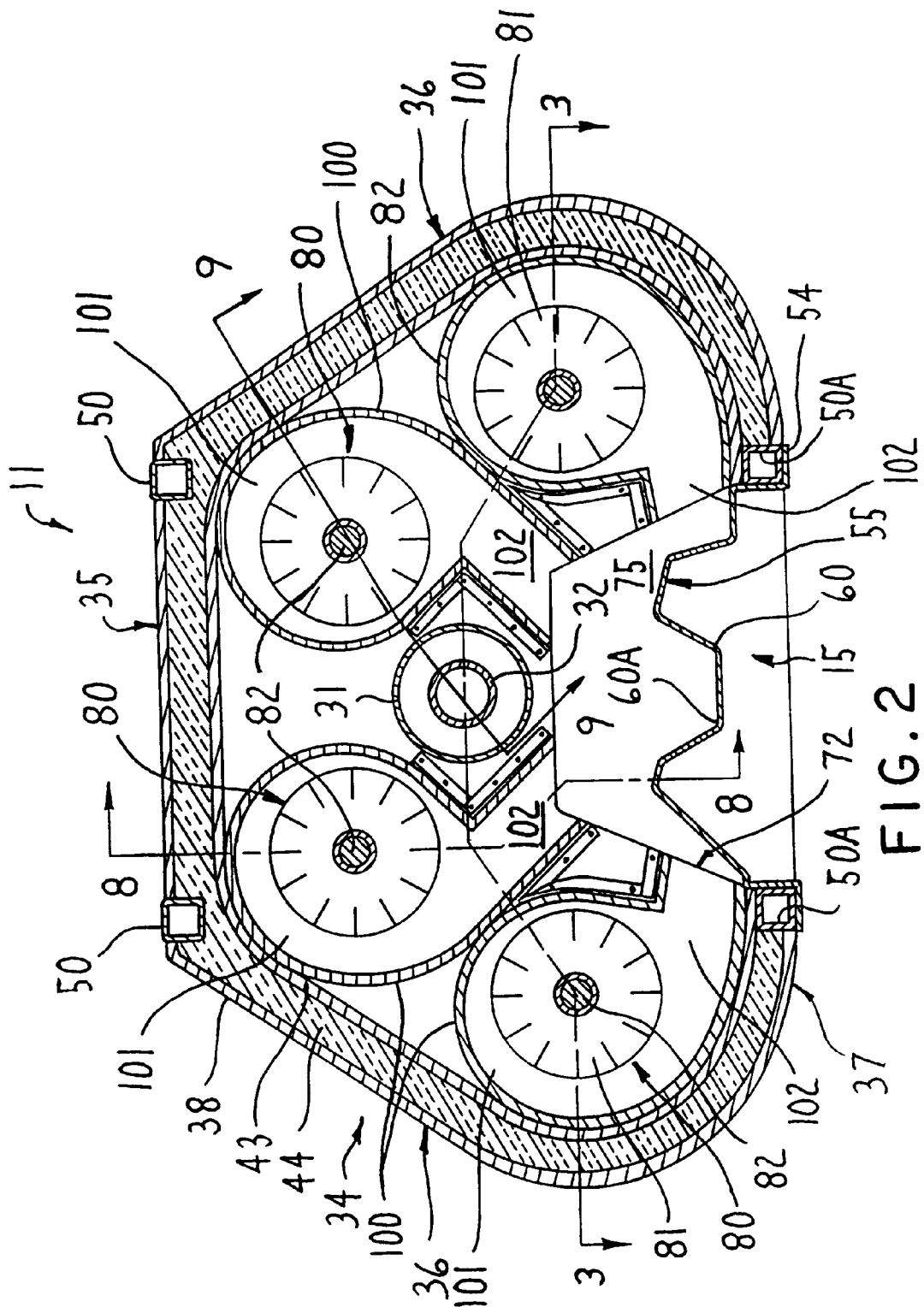
FIG. 2 is an enlarged cross-sectional view taken generally along the line 2—2 in FIG. 1.
Figure 4:
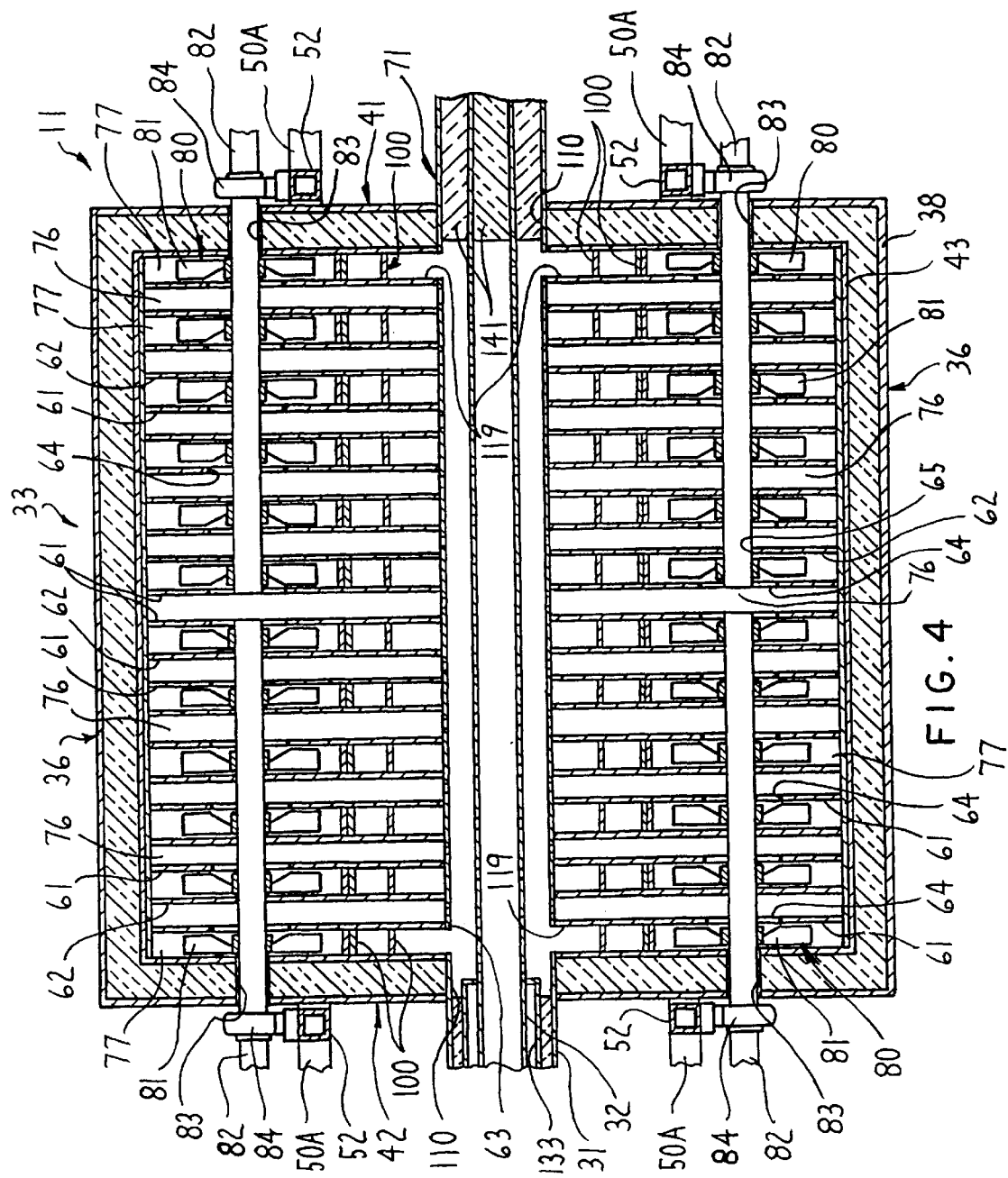
FIG. 4 is an enlarged, fragmentary view of the mold housing of FIG. 3.

Turning now to the mold arrangement 11, and with reference to FIGS. 2–4, same includes an air heating and supply assembly 30 embodied by an elongate outer shield tube 31 and an elongate inner burner tube 32 substantially concentrically nested within the outer shield tube 31. Mold arrangement 11 also includes a generally hollow mold housing 33, through which the outer and inner tubes 31 and 32 of the air heating and supply assembly 30 extend.

The mold housing 33 has a wall structure 34 which defines a generally flat top wall section 35, a pair of side wall sections 36 which angle outwardly and downwardly from top wall section 35, and a bottom wall section 37 which extends between and interconnects the side wall sections 36. The transition between the respective side wall sections 36 and the bottom wall section 37 is preferably smooth and curved in configuration (FIG. 2). The wall structure 34 also defines two spaced-apart and generally parallel end wall sections 41 and 42 which extend transversely between and interconnect the top, side, and bottom wall sections 35, 36, and 37 of the mold housing 33. The wall structure 34 is defined by an outer wall 38 and an inner wall 43, which inner wall 43 is spaced-apart from and parallel to outer wall 34 and defines the interior of the mold housing 33. Suitable support members (not shown) may be provided between the inner and outer walls 43 and 38 to provide added rigidity to the mold housing 33. Inner and outer walls 43 and 38 together define therebetween an open space in which an insulative material 44 is disposed so as to substantially completely fill same in order to minimize heat loss during the molding process. The overall shape of the mold housing 33 in transverse cross-section (FIG. 2) is generally similar to that of a truncated triangle.

The frame 12 of the mold arrangement 11 includes a plurality and preferably four horizontally oriented, parallel and elongate frame bars including an upper pair of frame bars 50 and a lower pair of frame bars 50A. The frame bars 50, 50A extend along the entire length of the mold housing 33, are perpendicular to the end wall sections 41 and 42, and terminate adjacent the respective side frames 13 and 14. The frame bars 50 and 50A are arranged with respect to one another so as to define a rectangle when viewed in transverse cross-section as shown in FIG. 2. The upper pair of frame bars 50 are fixedly attached, for example by welding, to the outer wall 38 of the top wall section 35 of mold housing 33, and partially occupy the space defined between the inner and outer walls 43 and 38.

Figure 12:
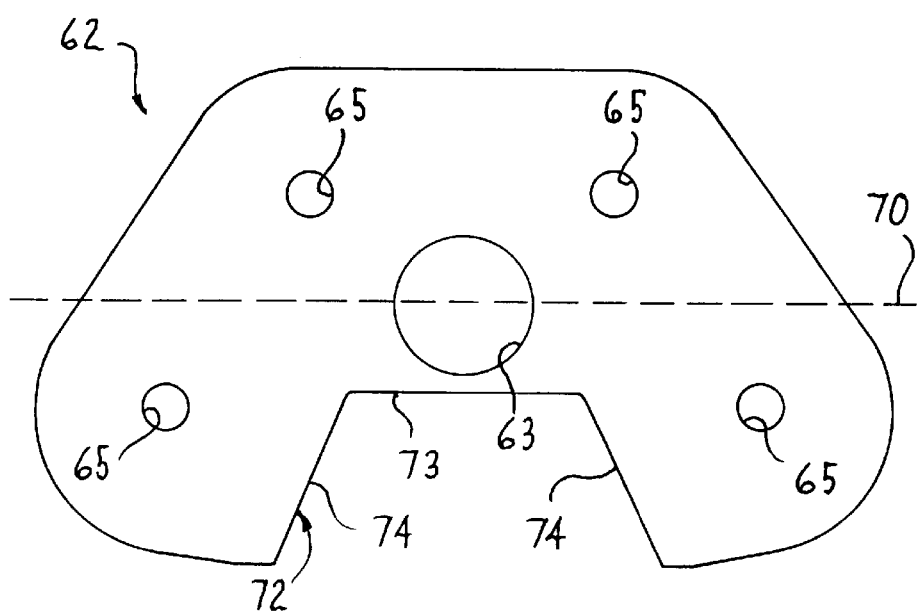
Figure 13:
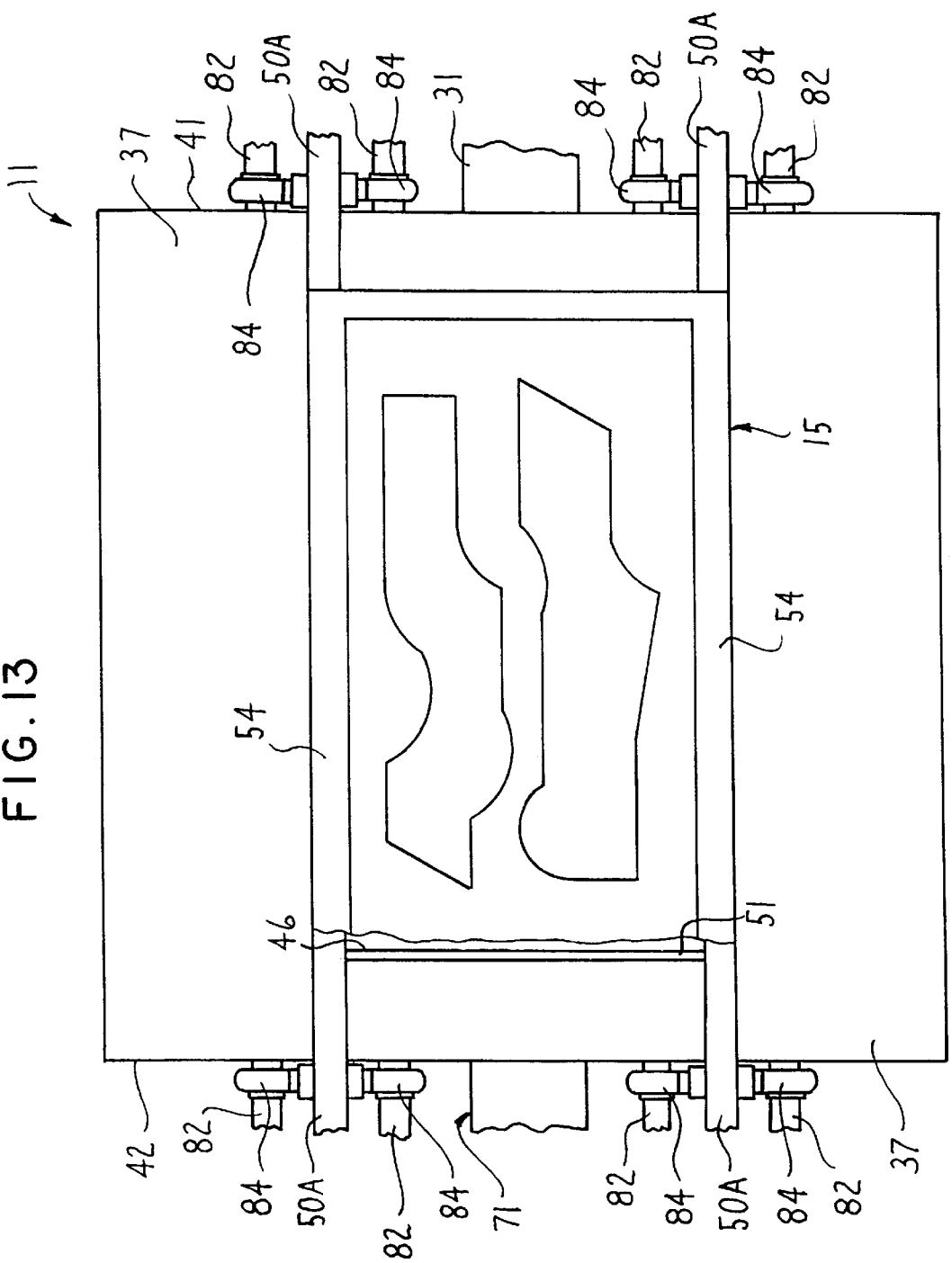
FIG. 13 is an enlarged, fragmentary bottom view of the mold housing generally in the direction indicated by the arrow A of FIG. 1.

The inner and outer walls 43 and 38 of the bottom wall section 37 of the mold housing 33 are fixedly attached at terminal edges thereof to the lower frame bars 50A (FIG. 2). The lower frame bars 50A, along with transversely extending edge portions 51 (only one of which is shown in FIG. 12) of the bottom wall section 37 spaced inwardly of the respective end wall sections 41 and 42, together define a generally rectangular opening 46 in which the mold shell 15 is stationarily disposed as discussed below.

The free ends of the upper frame bars 50 are connected to the free ends of the lower frame bars 50A by inner pairs of vertical frame bars 52 located adjacent the respective end wall sections 41 and 42 of the mold housing 33, and outer pairs of vertical frame bars 52A located adjacent the respective side frame 13 and 14. For added rigidity, an upper horizontal frame bar 53 (FIG. 10) interconnects the two upper frame bars 50 and a lower horizontal frame bar 53A interconnects the two lower frame bars 50A at each end of frame 12.

The mold shell 15, which is typically constructed of metal, is stationarily mounted on the mold box 33 by being disposed within the opening 46. The mold shell 15 typically has a surrounding edge flange 54 which enables same to be stationarily and fixedly seated on the mold box 33 so that the mold shell 15 is positioned within the opening 46 and projects into the interior of the mold box 33. The flange 54 may be fixed to the mold housing 33 by clips or other suitable fasteners (not shown). The mold shell 15 typically has a significant three-dimensional shape which provides a generally irregular contour throughout, which shape corresponds to the desired shape of the skin or shell product being molded.

The mold shell 15 has an outer molding surface 60 which defines therein a mold cavity 55 which opens inwardly from the outer side of the mold box 33. The mold shell 15 is typically rather thin and of approximately uniform thickness, and has an inner or back surface 60A which has a configuration similar to the outer molding surface 60. This back surface 60A is positioned inside the mold box 33 so as to partially define an interior surface of the mold box 33.

Figure 11:
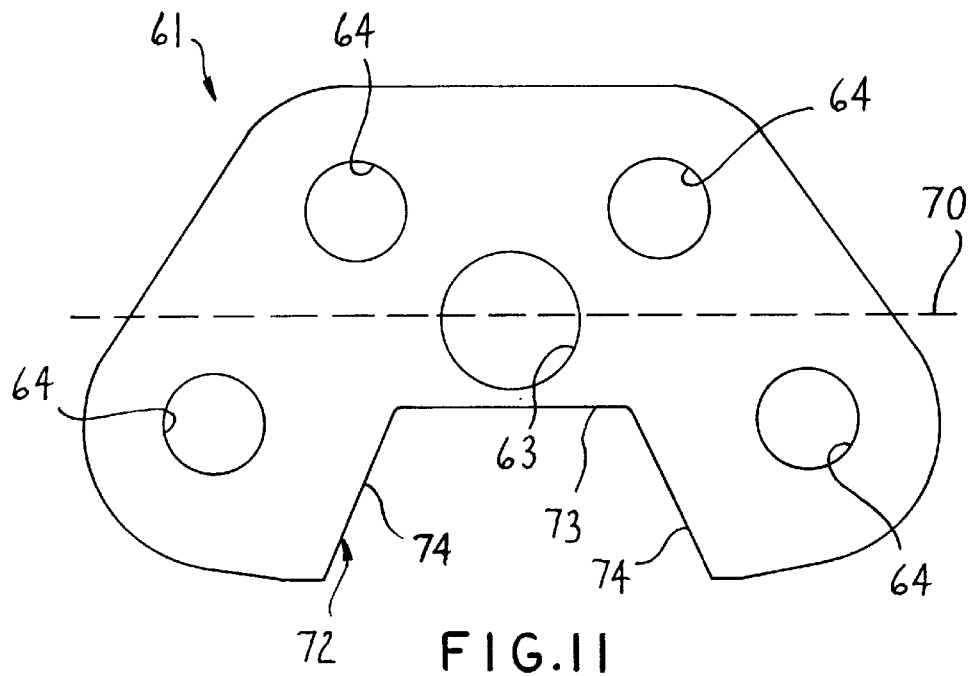
FIGS. 11 and 12 are plan views solely of the plate-like members of the mold housing.

As shown in FIGS. 3 and 4, a plurality of similarly configured plate-like members or partition walls 61 and 62 are mounted within the interior of the mold housing 33, and extend generally parallel to end wall sections 41 and 42 thereof. In the illustrated embodiment, as shown in FIGS. 11 and 12, the plate-like members 61 and 62 each have a generally centrally located hole 63 therein having a diameter similar to but slightly larger than an outer diameter of the outer shield tube 31. Plate-like members 61 (FIG. 11) have four holes 64 of equal diameter, which diameter is smaller than the diameter of central hole 63. Plate-like members 62 (FIG. 12) have four holes 65 of equal diameter, which diameter is smaller than the diameter of holes 64. Upper pairs of the holes 64 and 65 are spaced upwardly an equal distance from an imaginary horizontal plane extending perpendicularly through a central axis of central hole 63 as indicated by the dotted line 70. Bottom pairs of the holes 64 and 65 are spaced downwardly a similar distance from the horizontal plane 70, but are spaced outwardly from the respective upper pairs of holes 64 and 65, i.e. closer to the side wall sections 36 of the mold housing 33 than the upper pairs of holes 64 and 65.

Plate-like members 61 and 62 are alternately arranged in a uniformly spaced-apart manner with respect to one another along the longitudinal direction of mold housing 33, and are fixedly mounted (for example by welding) to the inner wall 43 along the top, side and bottom sections 35, 36 and 37 of the mold housing 33. The outer shield tube 31 and the inner burner tube 32 extend through the central hole 63 of each plate-like member 61 and 62, and same are fixedly mounted to an outer surface 71 of outer shield tube 31 at portions thereof which define the respective central holes 63.

Each plate-like member 61 and 62 defines a threesided edge portion 72 (FIGS. 11 and 12) having a generally horizontally extending top edge 73 which extends transversely between a pair of side edges 74 which angle outwardly and downwardly away from one another towards opening 46 (FIG. 2). The side edges 74, at the lower portions thereof closest to the lower pair of frame bars 50A, are located a distance from one another which is approximately equal to the transverse dimension of the opening 46. These recessed edge portions 72 of plate-like members 61 and 62, along with the back surface 60A of mold shell 33, cooperate to define an air chamber 75 (FIG. 2) within mold housing 33. The outer periphery of the plate-like members 61 and 62 is similar to the cross-sectional shape of the mold housing 33 (FIG. 2).

Figure 8:
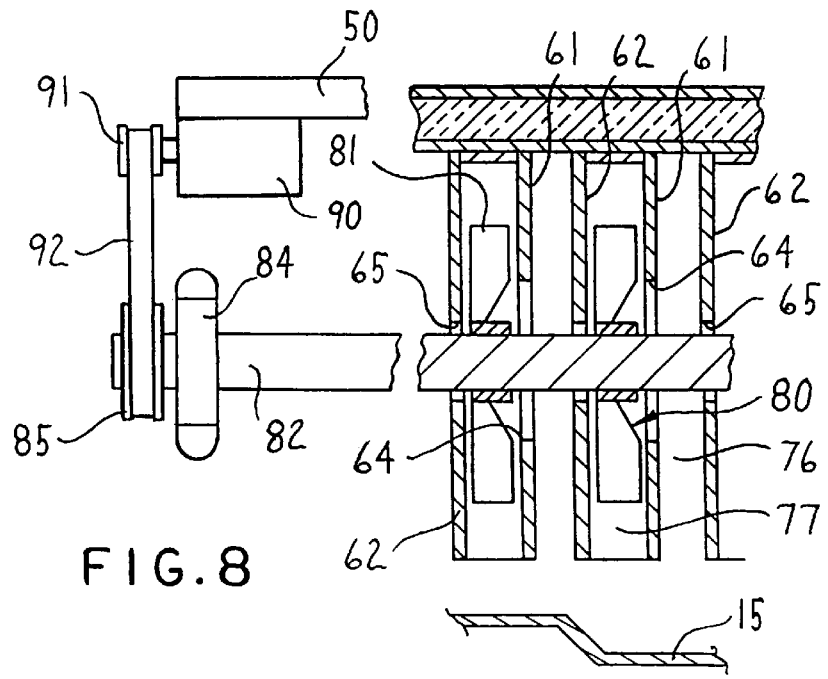
FIG. 8 is an enlarged, fragmentary, cross-sectional view taken generally along line 8—8 in FIG. 2.
Figure 9:
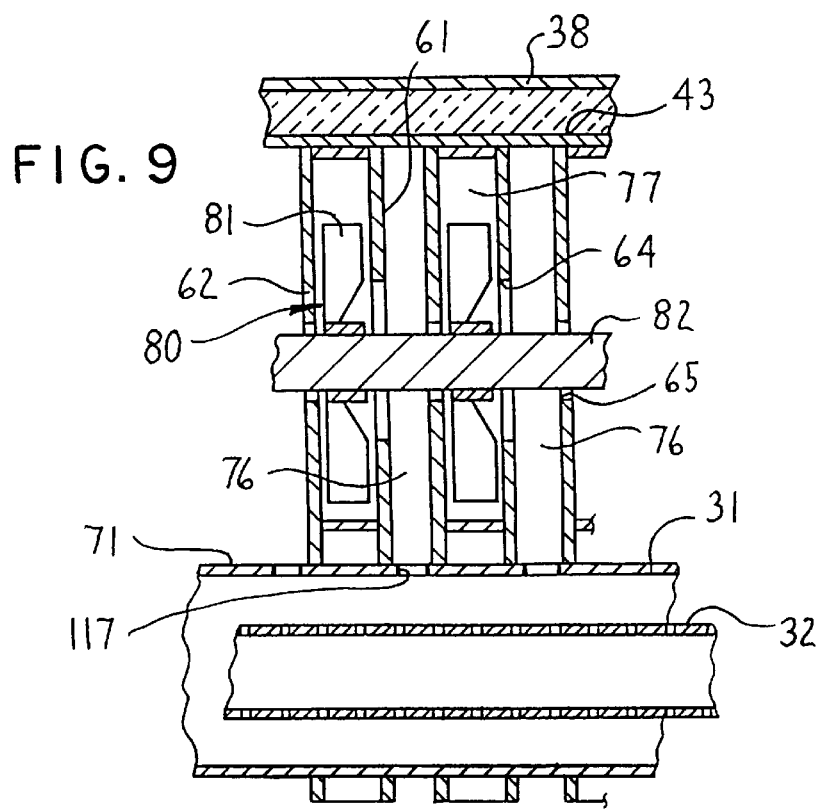
FIG. 9 is an enlarged, fragmentary, cross-sectional view taken generally along line 9—9 of FIG. 2.

As best shown in FIG. 4, the plate-like members 61 and 62 together define a plurality of generally vertically oriented feed channels 76, and a plurality of generally vertically oriented discharge channels 77, which feed and discharge channels alternate with one another along the longitudinal extent of the mold housing 33. All of the feed channels 76 and discharge channels 77 preferably open adjacent the back surface 60A of the mold shell 15 (FIG. 8).

The mold arrangement 11 includes a plurality of air flow control devices 80 disposed within the mold housing 33 and within the discharge channels 77 to control and direct heated air into the air chamber 75 adjacent the back surface 60A of the mold shell 15. The air flow control devices 80 in the illustrated embodiment are arranged to form eight flow control regions (i.e. four upper regions and four lower regions, the latter being shown in FIG. 3) within the mold housing 33. Each flow control region in the illustrated embodiment includes six air flow control devices 80. The flow control devices 80 are embodied by centrifugal fans, each including a fan wheel 81 having a plurality of blades which effect radial displacement of air in response to rotation thereof.

The fan wheels 81 of each flow region are nonrotatably mounted on an elongate shaft 82 which extends inwardly into the mold housing 33 through a hole 83 (FIG. 4) in the respective end wall section 41 or 42 and through the aligned holes 64 and 65 of the respective plate-like members 61 and 62. Each shaft 82 is rotatably supported by a pair of support bearings 84 fixedly mounted on the vertical support bars 52 and 52A of the frame 12. More specifically, as shown in FIGS. 3 and 10, the two upper shafts 82 are each supported by a bearing 84 mounted on an inwardly facing side surface of each inner and outer vertical frame bar 52 and 52A, and the two lower shafts 82 are supported by a bearing mounted on an outwardly facing side surface of each inner and outer vertical frame bar 52 and 52A.

Each shaft 82 preferably includes a pulley 85 nonrotatably mounted on the free end thereof. Further, each shaft 82 is associated with an electric motor 90 having a drive pulley 91 (only one of which motors 90 is shown in FIG. 8 for purposes of simplicity). The motor 90 rotatably drives the respective shaft 82 through a suitable drive connector or belt 92 which extends between the pulleys 85 and 91. Each motor 90 is fixedly mounted to an appropriate one of the frame bars 50 and 50A adjacent the free end of the respective shaft 82. A control arrangement (not shown) preferably controls each of the motors 90 individually so that each of the eight flow control regions can be individually operated and controlled to provide the desired heating characteristics.

The flow control devices 80 are disposed in the discharge channels 77 defined by the adjacent pairs of plate-like members 61 and 62. As best shown in FIGS. 2 and 3, two upper and two lower flow control devices 80 are located within each discharge channel 77 of the mold housing 33.

As shown in FIG. 4, a single feed channel 76 defined on each side by a plate-like member 61 serves to supply heated air to the air flow control devices 80 mounted at the inner terminal ends of each of the eight shafts 82. The remaining feed channels, however, are defined between an opposed pair of adjacent plates 61 and 62.

As shown in FIG. 2, each of the flow control devices 80 are surrounded by a shroud wall 100 which extends transversely between an adjacent pair of plate-like members 61 and 62 so as to divide up the respective discharge channel 77 into multiple discharge channels. When viewed in transverse cross-section as in FIG. 2, each of the shroud walls 100 substantially surrounds the respective flow control device 80 and defines a generally circular air flow chamber 101 in which the air flow control device 80 is located and rotates, and a generally linear flow channel 102 which is oriented so as to direct air flow generated by the fan blades towards the back surface 60A of the mold shell 15 (i.e. generally downwardly in FIG. 2 for the four upper flow control regions, and generally sidewardly in FIG. 2 for the four lower flow control regions). In this regard, the linear flow channels 102 preferably open beneath (with respect to FIG. 2) the outer shield tube 31 and into the air chamber 75 adjacent mold shell 15. The shroud wall 100 preferably terminates at the edge portions 72 of the respective pair of plate-like members 61 and 62. Each shroud wall 100 is preferably fixedly attached (by welding) to the respective plate like-members 61 and 62, and also may be attached at suitable locations to the inner wall 43 of the mold housing 33.

As shown in FIGS. 3 and 4, the air flow control devices 80 are coaxially supplied with heated air from the feed channels 76 along the rotational axis thereof through the feed holes 64 of the plate-like members 61 (FIG. 11). The flow control devices 80 discharge this heated air into the discharge channels 77 (defined by the plate-like members 61 and 62 and the shroud walls 100) to the air chamber 75 adjacent the back side 60A of the mold shell 33. Further, the plate-like members 61 and 62 which define the discharge channels 77 at the remote ends of the mold housing 33 (i.e. adjacent end wall sections 41 and 42) can preferably be bent axially inwardly adjacent the discharge ends thereof so that these endmost discharge channels 77 direct heated air toward the ends of the mold shell 33.

Figure 7:
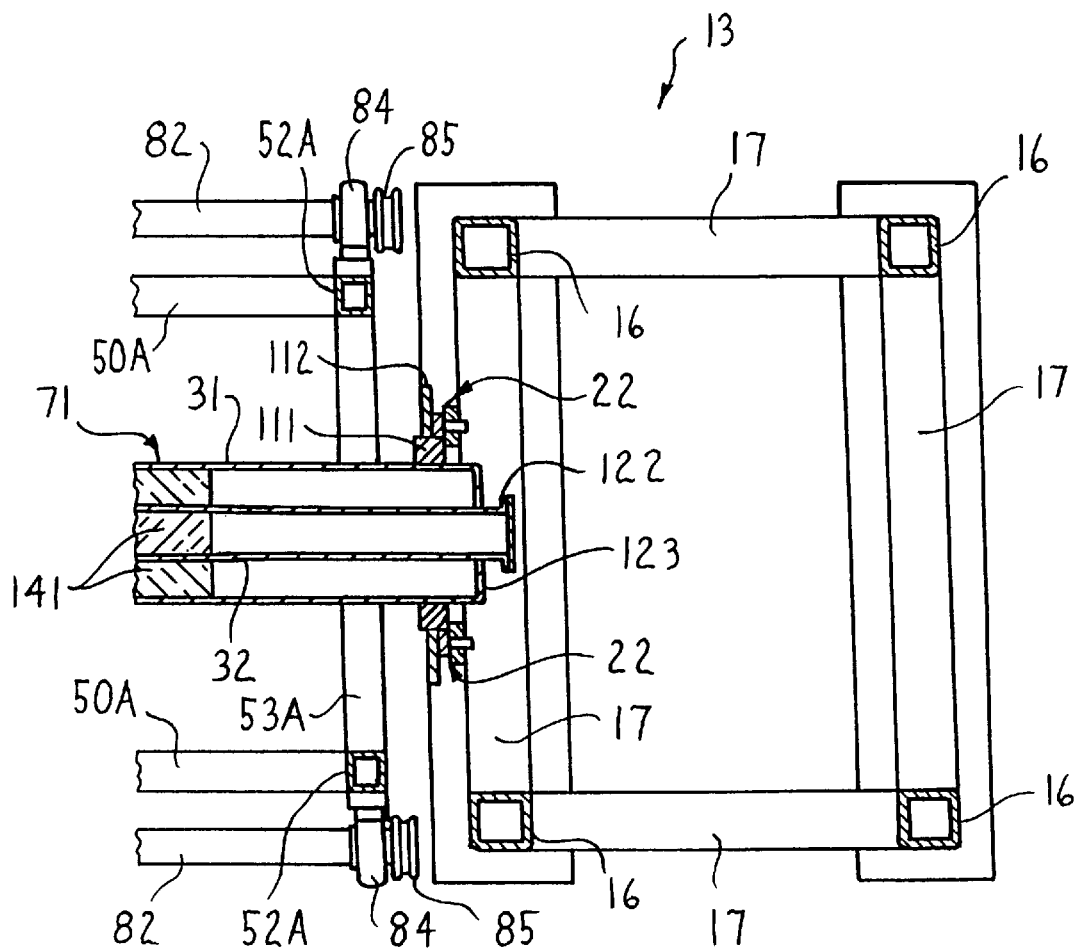
FIG. 7 is an enlarged, fragmentary view of the right longitudinal end of the molding system of FIG. 3.

Turning now to the air heating and supply assembly 30 of the mold arrangement 11, the outer shield tube 31 and the inner burner tube 32 thereof preferably extend completely through the interior of the mold housing 33 through holes 110 (FIG. 4) in the end wall sections 41 and 42 and central holes 63 of the plate-like members 61 and 62, and terminate adjacent end frames 13 and 14. The outer and inner walls 38 and 43 of end wall sections 41 and 42 are preferably welded to the outer tube 31. The terminal ends of the outer shield tube 31 adjacent the end frames 13 and 14 each preferably include an annular flange 111 (FIGS. 6 and 7) fixedly mounted thereon which is supported by the rollers 22 of the respective end frames 13 and 14 to permit rotation of the mold arrangement 11 with respect thereto.

The terminal end of the outer shield tube 31 adjacent right end frame 13 also includes a sprocket wheel 112 (FIGS. 7 and 10) fixedly fastened in surrounding relationship to the respective flange 111. As shown in FIGS. 1 and 10, a drive arrangement 113 is provided adjacent end frame 13, which drive arrangement 113 includes a conventional electric motor 114 and effects driving of a sprocket wheel 115 associated therewith and sprocket wheel 112 which are joined together by a drive chain 116. It will be appreciated that rotatably driving the mold arrangement 11 is conventional, and numerous conventional drive arrangements can be provided for such purpose.

Figure 5:
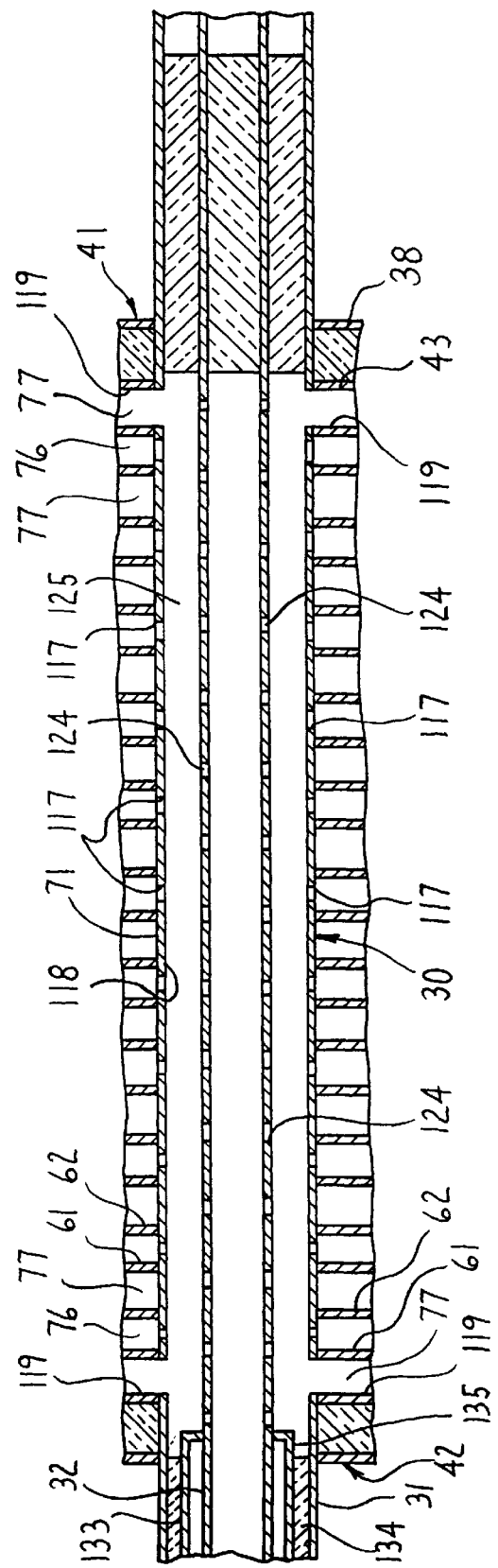
FIG. 5 is an enlarged, fragmentary view of the air heating and supply assembly of FIG. 3.

With reference to FIG. 5, the outer shield tube 31 also includes a plurality of holes 117 which extend transversely therethrough, and about the circumference thereof, for communication with each of the feed channels 76. The holes 117 are nonuniform in that same preferably increase in size as they progress away from the input end of tube 31 (i.e., from left to right in FIG. 5). Alternatively, in accordance with an embodiment not shown herein, the holes 117 aligned with each feed channel 76 may be of similar size to one another and increase in number progressively from left to right in FIG. 5. The outer shield tube 31 additionally includes openings 119 which communicate directly with the discharge channels 77 associated with the flow control devices 80 located at the remote ends of the mold housing 33 (i.e. the flow control devices 80 which are disposed closely adjacent end wall sections 41 and 42).

The inner burner tube 32 is preferably concentrically disposed within the outer shield tube 31 and has an open end 121 (FIG. 6) which is stationarily mounted to left end frame 14 in a manner discussed below, such that the outer tube 31 and mold housing 33 are rotatable with respect to inner tube 32. The opposite end 122 of burner tube 32 (FIG. 7) is preferably closed and is rotatably supported by an annular support plate 123 fixed to the end of the outer shield tube 31. With reference to FIG. 5, inner burner tube 32 also has a plurality of closely spaced holes 124 which extend therethrough and provide communication between the interior of the burner tube 32 and an annular space 125 defined between the tubes 32 and 31.

The air heating and supply assembly 30 includes a gas burner unit 130 stationarily mounted on left end frame 14 (FIGS. 1 and 6) by means of a plate 131 fixed to wall section 23 thereof. One type of burner usable in accordance with the invention is the commercially available Maxon Gas Burner (Model 400). The burner unit 130 includes an elongate nozzle 132 which extends into the open end 121 of the inner burner tube 32. The burner unit 130 also has a blower (not shown) incorporated therein which force feeds combustion air into and through the burner nozzle 132, which nozzle 132 then produces a flame inside the burner tube 32. The flame produced by the nozzle 132 extends substantially along the entire length of the burner tube 32 (i.e. from left to right in FIGS. 3–5). The outer tube 31 thus functions as a radiant heat shield around the burner flame.

The air heating and supply assembly 30 also includes an intermediate tube 133 disposed between the portions of the outer and inner tubes 31 and 32 which extend from the left end wall section 42 of the mold housing 33 to the left end frame 14. A layer of insulative material 134 is preferably disposed between tubes 133 and 31 to minimize heat loss. The end of the intermediate tube 133 closest to left end frame 14 and the open end 121 of the inner burner tube 32 are stationarily mounted to left end frame 14 by means of an annular plate 140 which is fixedly mounted to the plate 131.

As shown in FIG. 4, insulative material 141 is also provided inside the inner burner tube 32 at the end thereof adjacent end wall section 42 of the mold housing 33, and also between the inner and outer tubes 32 and 31 so as to minimize the escape of heat therefrom.

The operation of the molding apparatus will now be briefly described.

In operation, the motors 90 are activated to rotate the respective shafts 82 and flow control devices 80, and the burner unit 130 is activated to generate a flame within the inner burner tube 32. The heated air within the inner burner tube 32 is then forced through the holes 124 into the annular space 125, then out of the holes 117 of the shield tube 31 and into the respective feed channels 76. This heated air is then coaxially fed into the individual rotating flow control devices 80 through the feed holes 64, and is accelerated and discharged into the respective discharge passages 101 and 102 for discharge into the air chamber 75 whereby the discharged heated and high-velocity air impinges the back surface 60A of the mold shell so as to effect preheating thereof.

With the mold arrangement 11 disposed so that the mold shell 15 faces downwardly, a conventional mold closure box 150 containing particulate plastic material is lifted upwardly such as by a conventional lifting device 151 (FIG. 1), and attached to the mold housing 33 so as to enclose the mold cavity 55. The use and attachment of a mold closure box such as box 150 is conventional and further detailed description is believed unnecessary. The thus assembled mold arrangement 11 is then rotated about 180° so that the mold closure box 150 is disposed uppermost. This enables the plastic material within the mold closure box 150 to fall downwardly into the mold cavity 55 and contact the preheated outer molding surface 60 (FIG. 2) of the mold shell 15, thereby causing some of the plastic particles to immediately melt and create a thin skin which adheres to the outer molding surface 60. Depending upon the amount of preheat of the mold shell 15, together with any additional heating which continues at this point by supplying additional heated air into the air chamber 75, additional plastic material will effectively partially gel and stick together and create a buildup of a desired thickness, which thickness is controlled by the amount of heat provided by the mold shell 15. After a time period sufficient to create the desired buildup or thickness, the mold arrangement 11 is again rotated so that the mold closure box 150 is swung downwardly into a lowered position, causing the excess material in the mold cavity 55 to fall back into the mold closure box 150, whereupon the mold closure box 150 is detached from the mold housing 33 and returned to the lifting device 151. The mold arrangement 11 may then again be rotated back up to a position wherein the mold shell 15 and the mold cavity 55 face approximately upwardly, and additional heated air is supplied to the air chamber 75 to effect melting of the plastic buildup throughout the mold cavity 55 to result in formation of a molded skin or shell which is of generally uniform or desired thickness having substantially uniform properties throughout.

After final heating of the mold arrangement 11 to permit proper molding of the molded skin or shell, the mold shell 15 can be removed from the mold housing 33 and the skin formed thereon removed once the mold shell 15 has cooled. In this regard, the supply of heated air to the air chamber 75 may be discontinued prior to removal of the mold shell 15 from the mold housing 33, or alternatively may be continued in order to keep the mold arrangement 11 at a high temperature in readiness for the next molding operation whereby another mold shell is attached to the mold housing 33.

During the preheating and final heating of the mold arrangement 11 as described above, some or all of the flow control devices 80 in each of the flow control regions will be energized for appropriate periods of time, and at appropriate rotational speeds so as to provide for the desired degree of heat supplied to the back surface 60A of the mold shell 33 as the heated air flows into the air chamber 75.

The high velocity at which the heated air is discharged into the air chamber 75 by the centrifugal flow control devices 80 enables a larger volume of air to be discharged into chamber 75, and thus less heat may be necessary. Further, because heated air is generated by the burner unit 130 along substantially the entire longitudinal extent of the inner burner tube 32 and thus discharged along substantially the entire longitudinal extent of the mold housing 33 and mold shell 15, and because the flow control devices 80 are arranged close to one another along the longitudinal extent of the mold housing 33, a more uniform supply and distribution of heat is provided to the chamber 75 and to the mold cavity 55, to thus compensate for irregularities in mold shell 15 caused by protrusions or cavities therein.

Further, the number of centrifugal flow control devices 80 and the placement thereof within mold housing 33 may vary depending on the particular shape of the mold shell 15 utilized in a molding process.

The openings 117 in the outer tube 31 are preferably arranged and configured to provide a progressive increase in the quantity of heated air from the end of the outer tube 31 adjacent burner unit 130 to the remote end of the outer tube 31 adjacent the right end frame 13. In this regard, the pattern and size of the openings 117 of the outer tube 31 and the openings 124 of the inner tube 32 can preferably be adjusted with respect to one another to control the discharge of heated air from the outer tube 31 as desired. More specifically, the openings 117 are sized and/or the number thereof is selected so that the flow area of openings 117 aligned with each feed channel progressively increases from the end of outer tube 31 adjacent the burner unit 130 to the remote end adjacent end frame 13 so that air having a uniform velocity is provided along the entire longitudinal extent of the mold housing 33. This arrangement of holes 117 and 124 thus enables a uniform quantity of heat to be supplied to the chamber 75 and thus to the mold shell 15.

In addition, the holes 119 in the ends of the outer tube 31 which communicate with the discharge channels 77 associated with the flow control devices 80 at the remote ends of the mold housing 33 preferably allow these flow control devices 80 to supply additional air flow into the outer tube 31 which serves to increase air pressure therewithin and also serves to increase overall circulation of the heated air within the mold housing 33. Further, since the feed channels 76 communicate both with the interior of the outer tube 31 and the air chamber 75, heated air from the air chamber 75 (in addition to the heated air discharged from the outer tube 31) can be fed into the feed channels 76 and redistributed into the respective discharge channels 77 by the flow control devices 80.

In accordance with the embodiment of the invention as described above, the inherent leakage from the molding system 10 serves to exhaust the heated air therefrom, which leakage compensates for the volume of the heated air supplied by the burner unit 130.

Figure 14:
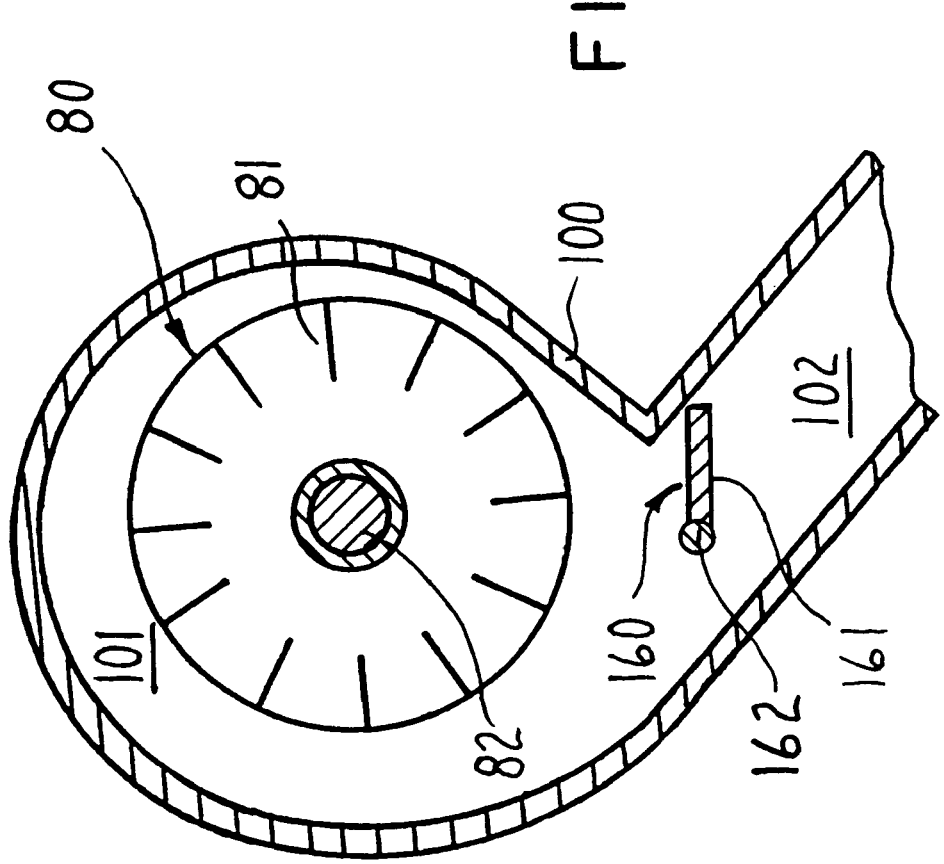
FIG. 14 is an enlarged fragmentary, cross-sectional view similar to FIG. 2 and illustrates a modification of the invention.

Referring now to FIG. 14, there is illustrated a fragmentary cross-sectional view of a modification of the invention which is identical to the mold arrangement 11 illustrated in FIGS. 1–13, but additionally includes a movable flow control damper or deflector 160 to assist in desirable control of the heated air through the discharge channels 77 as defined by the plate-like members 61 and 62 and the corresponding shroud walls 100.

More specifically, to provide for more optimum control of air flow into the air chamber 75, each of the discharge passages 102 is preferably provided with the movable flow-control damper or deflector 160. As shown in FIG. 14, a swingable deflector plate 161 is provided in each of the flow channels 102 for swinging or oscillating movement about a suitable pivot 162 so as to maintain an even or constant velocity of heated air as applied to the back surface 60A of the mold shell 15. The movement of the deflector plates 161 may be controlled by a motor (not shown) associated with each of the eight flow control regions.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold arrangement for molding thermoplastic particles into a thin shell, said mold arrangement comprising:
    a mold housing defining therein a hollow interior and having a mold shell mounted thereon defining a mold cavity which opens outwardly and is defined by a front surface of said mold shell;
    said mold housing having a wall structure disposed within said interior cooperating with a back surface of said mold shell to define an interior air chamber, said wall structure including a plurality of partition walls cooperating to define a plurality of discharge and feed channels, said feed channels communicating with a source of heated air and said discharge channels communicating with said air chamber; and
    a plurality of flow control devices each disposed to communicate with one of said discharge channels for directing heated air fed to said flow control device from a corresponding one of said feed channels into said air chamber and toward said back surface of said mold shell.

2. The arrangement of claim 1 wherein each said flow control device is a centrifugal fan supported for rotation about an axis parallel to the longitudinal extent of said mold shell.

3. The arrangement of claim 1 including deflector means pivotably mounted for swinging movement adjacent at least some of said flow control devices to control discharge of heated air into said air chamber.

4. The arrangement of claim 2 wherein said wall structure includes a plurality of shroud walls extending transversely between pairs of said partition walls to further define said discharge channels, each said shroud wall surrounding a respective one of said centrifugal fans and being configured to direct heated air into said air chamber.

5. The arrangement of claim 2 including a plurality of air flow control regions each including a rotatable shaft and a selected number of said centrifugal fans, said centrifugal fans each including a bladed wheel nonrotatably mounted on a corresponding one of said shafts and each said shaft being rotatably driven by its own drive arrangement.

6. The arrangement of claim 5 wherein each said drive arrangement is controllable separately from other ones of said drive arrangements to selectively control flow of heated air into selected areas of said air chamber.

7. The arrangement of claim 1 wherein said discharge and feed channels are arranged in an alternating manner with respect to one another within said mold housing and along the longitudinal extent thereof, said feed channels additionally communicating with said air chamber.

8. The arrangement of claim 1 further including an elongate tubular member having a portion extending within said interior of said mold housing and having an inner portion in communication with each of said feed channels, and a heat source connected to one end of said tubular member configured to generate heated air within and along a portion of said inner portion thereof to provide a uniform amount of heated air to said feed channels along the longitudinal extent of said mold housing.

9. A molding arrangement for molding thermoplastic particles into a thin shell, said arrangement comprising:
    a mold housing defining therein a hollow interior and having a mold shell mounted thereon defining a mold cavity which opens outwardly and is defined by a front surface of said mold shell;
    said mold housing including a wall structure which cooperates with a back surface of said mold shell to define an interior air chamber, and said wall structure defining a plurality of discharge and feed channels within said interior of said mold housing, said discharge channels opening into said air chamber;
    a tubular member having a portion extending within said interior of said mold housing and along substantially the entire length thereof, said portion of said tubular member having a plurality of openings therein each aligned with a respective one of said feed channels;

a plurality of air control devices each disposed to communicate with one of said discharge channels for directing heated air fed to said flow control device from a corresponding one of said feed channels into said air chamber and toward said back surface of said mold shell; and a heat source including means for generating heated air within said portion along the entire length thereof to provide a uniform flow of heated air to said feed channels through said openings.

10. The arrangement of claim 9 wherein said portion of said tubular member has a first end adjacent said heat source and a second end remote therefrom, said openings being configured to provide increased flow of heated air into said feed channels from said first end to said second end.

11. The arrangement of claim 9 wherein said tubular member is an outer tubular member and said arrangement further includes an inner tubular member disposed within said outer tubular member, said inner tubular member having a plurality of holes extending therethrough, said inner tubular member having an open end adjacent said heat source, and said heat source including a burner having a nozzle extending into said open end and along a portion of said interior of said inner tubular member.

12. The arrangement of claim 11 wherein said nozzle is configured to generate a flame within said interior of said inner tubular member and along substantially the entire longitudinal extent thereof.

13. The arrangement of claim 11 further including a generally stationary support frame, said outer tubular member being fixedly fastened to said mold housing and having a first end adjacent said heat source and a second end remote therefrom, said first and second ends being rotatably supported on said frame for rotation of said mold housing and said outer tubular member with respect thereto.

14. The arrangement of claim 13 wherein said inner tubular member and said burner are fixedly fastened to said support frame such that said mold housing and said outer tubular member are rotatable relative thereto.

15. A mold arrangement for molding thermoplastic particles into a thin shell, said mold arrangement comprising:

a mold housing defining therein a hollow interior and having a mold shell mounted thereon defining a mold cavity which opens outwardly and is defined by a front surface of said mold shell;

said mold housing having a wall structure disposed within said interior cooperating with a back surface of said mold shell to define an interior air chamber, said wall structure including a plurality of partition walls disposed transversely within said mold housing and defining a plurality of discharge and feed channels arranged in an alternating manner along the longitudinal extent of said mold housing, said discharge channels opening into said air chamber and said feed channels communicating with a source of heated air; and a plurality of flow control devices, at least one said flow control device being disposed within each said discharge channel for directing heated air fed to said flow control device from a corresponding one of said feed channels into said air chamber and toward said back surface of said mold shell, each said flow control device being supported for rotation about an axis substantially parallel to the longitudinal extent of said mold shell.

16. The arrangement of claim 15 further including an elongate tubular member extending through said interior of said mold housing and transversely with respect to said partition walls, said tubular member being configured to supply a uniform quantity of heated air to each said discharge channel along the longitudinal extent of said mold housing.

17. The arrangement of claim 16 wherein a plurality of said flow control devices are arranged in each said discharge channel in a generally arcuate array about said tubular member.

18. The arrangement of claim 16 wherein each said flow control device is a centrifugal fan configured to discharge heated air radially within said discharge channels and toward said back surface of said mold shell.

* * * * *